(12) United States Patent
Tokizaki et al.

(10) Patent No.: US 11,719,310 B2
(45) Date of Patent: Aug. 8, 2023

(54) SPEED REDUCTION MECHANISM AND SPEED REDUCTION MECHANISM-EQUIPPED MOTOR

(71) Applicant: MITSUBA Corporation, Gunma (JP)

(72) Inventors: Teppei Tokizaki, Gunma (JP); Naoki Kojima, Gunma (JP); Motoaki Kobayashi, Gunma (JP); Shunji Kumagai, Gunma (JP)

(73) Assignee: MITSUBA Corporation, Gunma (JP)

( * ) Notice: Subject to any disclaimer, the term of this patent is extended or adjusted under 35 U.S.C. 154(b) by 121 days.

(21) Appl. No.: 17/607,897

(22) PCT Filed: Jun. 26, 2020

(86) PCT No.: PCT/JP2020/025294
§ 371 (c)(1),
(2) Date: Oct. 31, 2021

(87) PCT Pub. No.: WO2021/065120
PCT Pub. Date: Apr. 8, 2021

(65) Prior Publication Data
US 2022/0316558 A1    Oct. 6, 2022

(30) Foreign Application Priority Data
Sep. 30, 2019  (JP) ................. 2019-178263

(51) Int. Cl.
*F16H 1/08* (2006.01)
*F16H 55/08* (2006.01)

(52) U.S. Cl.
CPC .............. *F16H 1/08* (2013.01); *F16H 55/08* (2013.01); *F16H 2055/0893* (2013.01)

(58) Field of Classification Search
CPC ..... F16H 1/08; F16H 55/08; F16H 2055/0983
See application file for complete search history.

(56) References Cited

U.S. PATENT DOCUMENTS

| 676,641 | A | * | 6/1901 | Venn | F16H 55/08 74/466 |
| 8,789,437 | B2 | * | 7/2014 | Stanovskoy | F16H 55/08 74/462 |
| 2010/0095792 | A1 | | 4/2010 | Stanovskoy et al. | |

FOREIGN PATENT DOCUMENTS

| CN | 101328967 | 12/2008 |
| JP | 2009248852 | 10/2009 |

(Continued)

OTHER PUBLICATIONS

"International Search Report (Form PCT/ISA/210) of PCT/JP2020/025294," dated Jul. 28, 2020, with English translation thereof, pp. 1-4.

*Primary Examiner* — Jake Cook
(74) *Attorney, Agent, or Firm* — JCIPRNET

(57) ABSTRACT

A speed reduction mechanism and a motor equipped with the speed reduction mechanism are provided. A pinion gear is provided with one spiral engagement projected part, and a helical gear is provided with a plurality of engagement recessed parts with which the engagement projected part is engaged. The engagement projected part and the engagement recessed part are formed so that their cross-sectional shapes along a direction orthogonal to an axial direction of the pinion gear are in arc shapes. A shape of helical teeth and a shape of the engagement recessed part are determined based on a shape of the engagement projected part provided on a spiral tooth.

4 Claims, 11 Drawing Sheets

(56) References Cited

FOREIGN PATENT DOCUMENTS

| JP | 2017133582 | 8/2017 |
|----|------------|--------|
| WO | 2019194222 | 10/2019 |

* cited by examiner

SPEED REDUCTION MECHANISM AND SPEED REDUCTION MECHANISM-EQUIPPED MOTOR

CROSS-REFERENCE TO RELATED APPLICATION

This application is a 371 application of the International PCT application serial no. PCT/JP2020/025294, filed on Jun. 26, 2020, which claims the priority benefits of Japan Patent Application No. 2019-178263, filed on Sep. 30, 2019. The entirety of each of the above-mentioned patent applications is hereby incorporated by reference herein and made a part of this specification.

BACKGROUND

Technical Field

The disclosure relates to a speed reduction mechanism including a first gear and a second gear that are engaged with each other and a motor equipped with the speed reduction mechanism.

Description of Related Art

Conventionally, a motor equipped with a speed reduction mechanism which is small-sized but may provide high output has been used as a drive source of a wiper device, a power window device or the like mounted on a vehicle such as an automobile. Such a motor equipped with a speed reduction mechanism for automobile use is described in, for example, Patent Document 1.

The motor equipped with a speed reduction mechanism described in Patent Document 1 is used as a drive source of a seat lifter device and includes an electric motor and a housing. A helical gear having a small gear number rotated by the rotary shaft of the electric motor, a driven side helical gear engaged with the helical gear having a small gear number, a worm integrally rotated with the driven side helical gear, and a worm wheel engaged with the worm are rotatably housed in the housing.

As described above, in the motor equipped with a speed reduction mechanism described in Patent Document 1, a two-stage speed reduction mechanism is housed in the housing. Specifically, the first-stage speed reduction mechanism is composed of the helical gear having a small gear number and the driven side helical gear, and the second-stage speed reduction mechanism is composed of the worm and the worm wheel. This allows the motor equipped with a speed reduction mechanism to be made compact and installed beside the seat.

RELATED ART

Patent Document(s)

Patent Document 1: Japanese Patent Application Laid-Open No. 2017-133582

SUMMARY

Problems to be Solved

However, in the technique described in Patent Document 1, for example, involute gears are used for the helical gear having a small gear number and the driven side helical gear that constitute the first-stage speed reduction mechanism. Therefore, when it is necessary to further increase the reduction ratio, the following problems may occur.

That is, in order to increase the reduction ratio, it is necessary to increase the difference in the number of teeth between the helical gear having a small gear number and the driven side helical gear. However, the number of the teeth on the helical gear having a small gear number is already as small as "2". Therefore, when it is considered to increase the number of the teeth on the driven side helical gear, adjacent teeth on the driven side helical gear are arranged close to each other, and the engaging surface of the teeth stands substantially vertically and becomes flat.

Then, the teeth on the helical gear having a small gear number and the teeth on the driven side helical gear interfere with each other, consequently resulting in deterioration of the state of engagement. Thus, in the involute gear, there is a limit to meeting the needs for further increasing the reduction ratio without increasing the body size of the speed reduction mechanism.

An objective of the disclosure is to provide a speed reduction mechanism, which is provided with gears formed in an engaging shape capable of increasing the reduction ratio, and a motor equipped with the speed reduction mechanism.

Means for Solving the Problems

A speed reduction mechanism according to the disclosure includes a first gear and a second gear, and includes one first tooth part, an engagement projected part, a plurality of second tooth parts, and an engagement recessed part. The first tooth part is provided on the first gear and spirally extends in an axial direction of the first gear. The engagement projected part is provided on the first tooth part, has a cross-sectional shape, which is along a direction orthogonal to the axial direction of the first gear, formed in an arc shape, and has a curvature center provided at a position eccentric from a rotation center of the first gear. The plurality of second tooth parts are provided on the second gear, are inclined with respect to the axial direction of the first gear, and are arranged in a circumferential direction of the second gear. The engagement recessed part is provided between adjacent second tooth parts, has a cross-sectional shape, which is along a direction orthogonal to the axial direction of the first gear, formed in an arc shape, and is engaged with the engagement projected part. When the second gear is viewed from the axial direction of the first gear, a shape of the second tooth part is in a curve shape that is shifted from an operation locus of the curvature center of the engagement projected part toward a radially inner side of the second gear by a curvature radius of the engagement projected part, and a shape of the engagement recessed part is in an arc shape having a radius that is the curvature radius of the engagement projected part and having a center that is a point arranged on a most radially inner side of the second gear among points that form the operation locus of the curvature center of the engagement projected part.

A motor equipped with a speed reduction mechanism according to the disclosure includes a motor having a rotating body, a first gear rotated by the rotating body, and a second gear rotated by the first gear. The motor equipped with a speed reduction mechanism further includes one first tooth part, an engagement projected part, a plurality of second tooth parts, an engagement recessed part, and an output shaft. The first tooth part is provided on the first gear and spirally extends in an axial direction of the first gear. The engagement projected part is provided on the first tooth part, has a cross-sectional shape, which is along a direction orthogonal to the axial direction of the first gear, formed in an arc shape, and has a curvature center provided at a position eccentric from a rotation center of the first gear. The plurality of second tooth parts are provided on the second gear, are inclined with respect to the axial direction of the first gear, and are arranged in a circumferential direction of the second gear. The engagement recessed part is provided between adjacent second tooth parts, has a cross-sectional shape, which is along a direction orthogonal to the axial direction of the first gear, formed in an arc shape, and is engaged with the engagement projected part. The output shaft is provided at a rotation center of the second gear. When the second gear is viewed from the axial direction of the first gear, a shape of the second tooth part is in a curve shape that is shifted from an operation locus of the curvature center of the engagement projected part toward a radially inner side of the second gear by a curvature radius of the engagement projected part, and a shape of the engagement recessed part is in an arc shape having a radius that is the curvature radius of the engagement projected part and having a center that is a point arranged on a most radially inner side of the second gear among points that form the operation locus of the curvature center of the engagement projected part.

In another embodiment of the disclosure, coordinates x and y of the operation locus of the curvature center of the engagement projected part are defined by Formulas (1) and (2) below:

$$x = a \times \sin\theta - e \times \sin(Z+1) \times \theta \quad (1)$$

$$y = a \times \cos\theta - e \times \cos(Z+1) \times \theta \quad (2)$$

where a is a distance between the curvature center of the engagement projected part and a rotation center of the second gear, Z is a number of the second tooth parts, e is an eccentric amount of the curvature center of the engagement projected part with respect to the rotation center of the first gear, and θ is a rotation angle of the first gear.

Effects

According to the disclosure, the first gear is provided with one spiral engagement projected part, and the second gear is provided with a plurality of engagement recessed parts with which the engagement projected part is engaged. The engagement projected part and the engagement recessed part are formed so that their cross-sectional shapes along a direction orthogonal to the axial direction of the first gear are in arc shapes. The shape of the second tooth part and the shape of the engagement recessed part are determined based on the shape of the engagement projected part provided on the first tooth part.

Therefore, the first gear and the second gear may be configured in an arc-shaped projected/recessed engaging structure that does not deteriorate the state of engagement therebetween. Also, by increasing the number of teeth on the second gear while keeping the number of teeth on the first gear at one tooth, the difference in the number of teeth can be easily increased. Therefore, the reduction ratio of the speed reduction mechanism can be increased without increasing the body size thereof.

Figure 4:
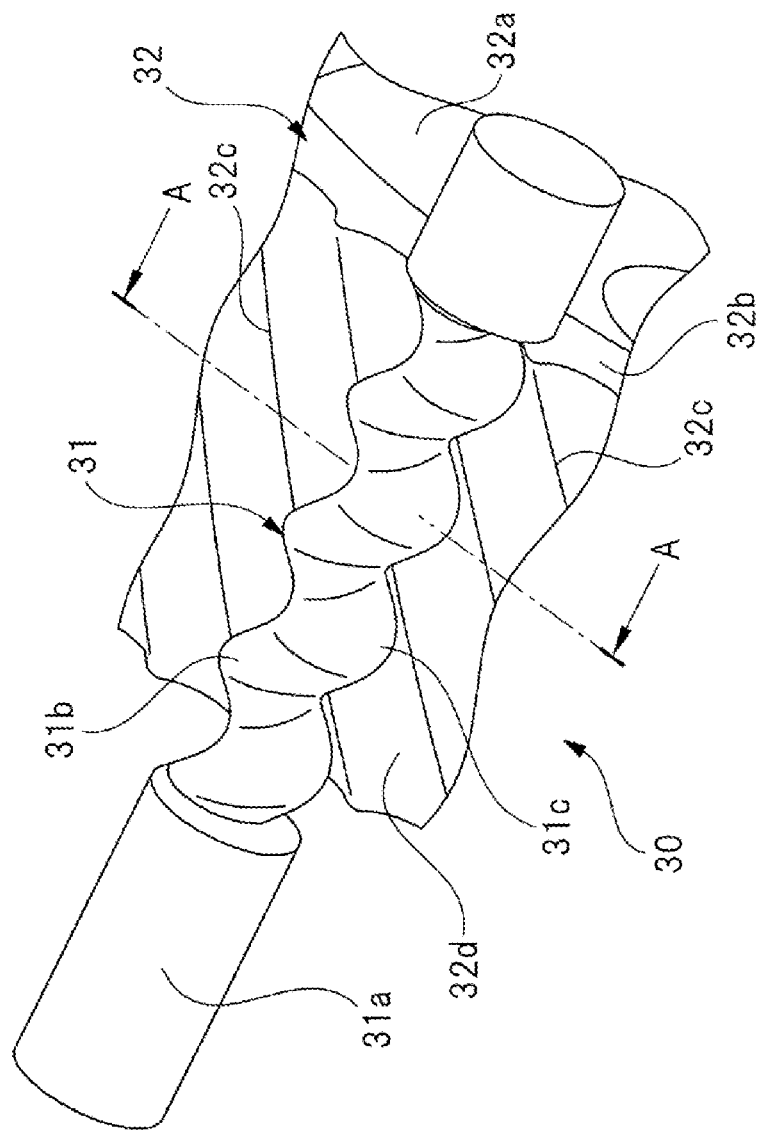
FIG. 4 is an enlarged perspective view of engaging portions of a pinion gear and a helical gear.
Figure 5:
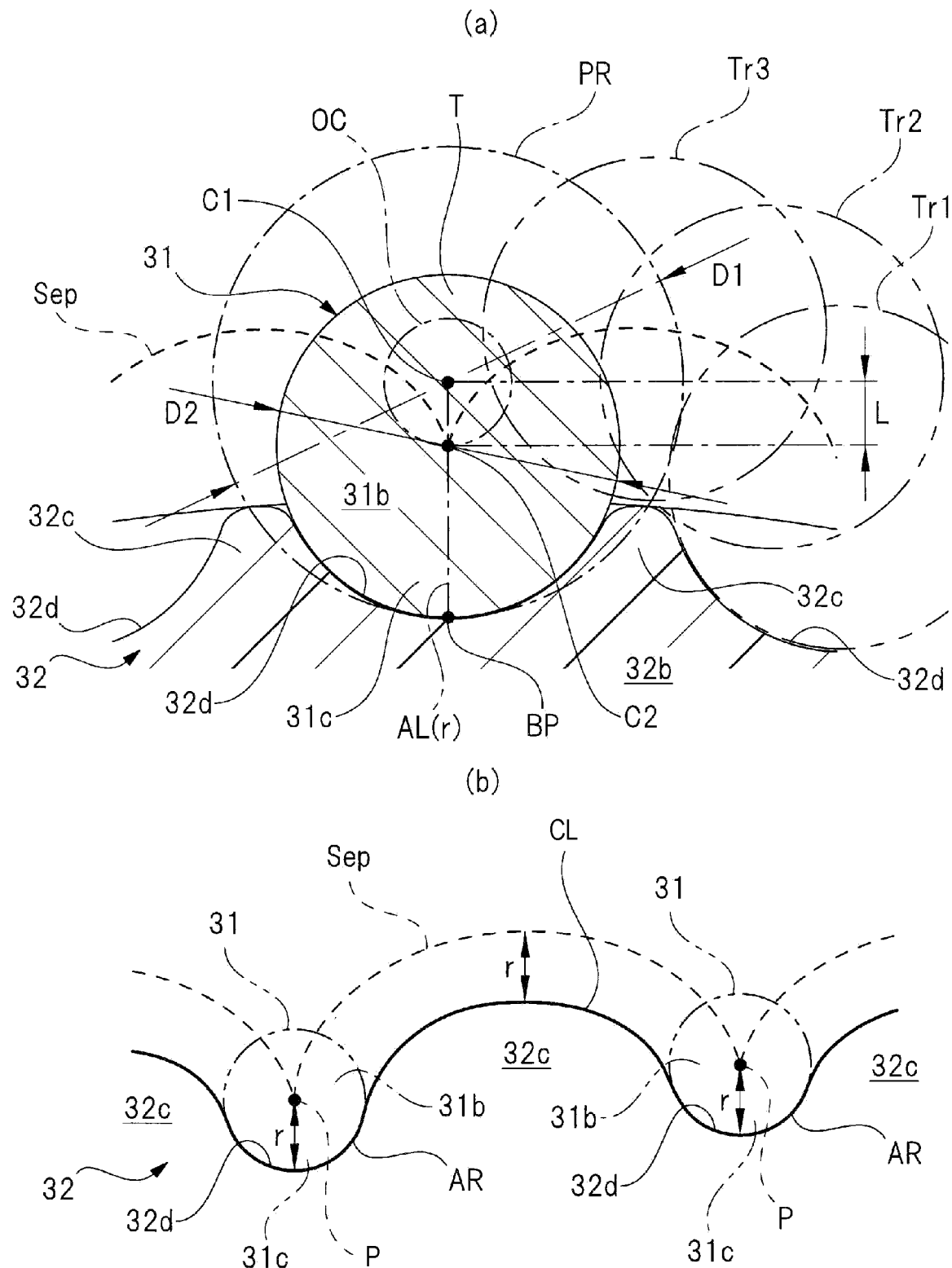

(a) of FIG. 5 is a cross-sectional view taken along line A-A of FIG. 4, and (b) of FIG. 5 is a view showing determination of a shape of helical teeth based on a shape of an engagement projected part.

Figure 6:
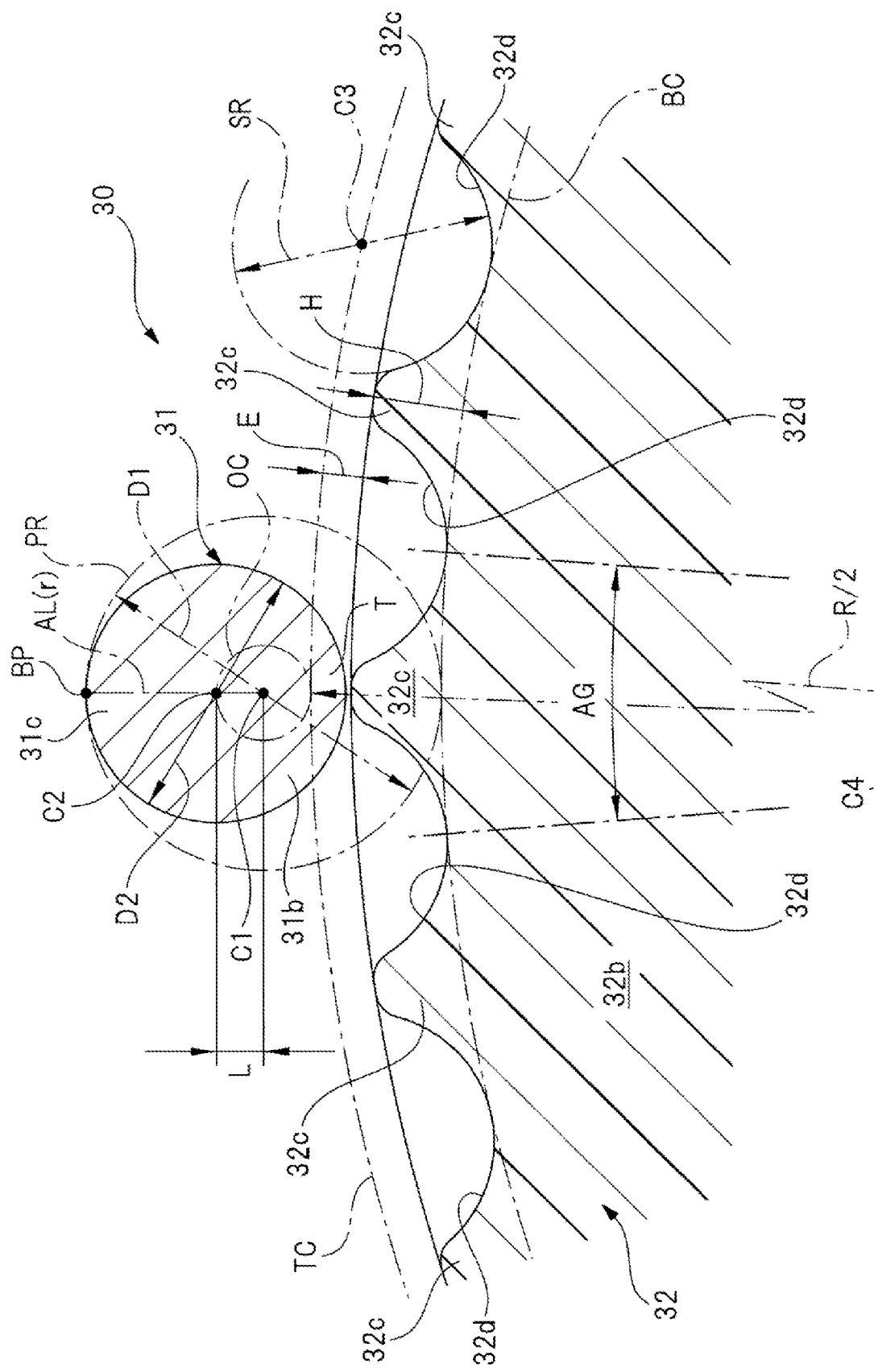

FIG. 6 is a view showing detailed shapes of the pinion gear and the helical gear.

Figure 7:
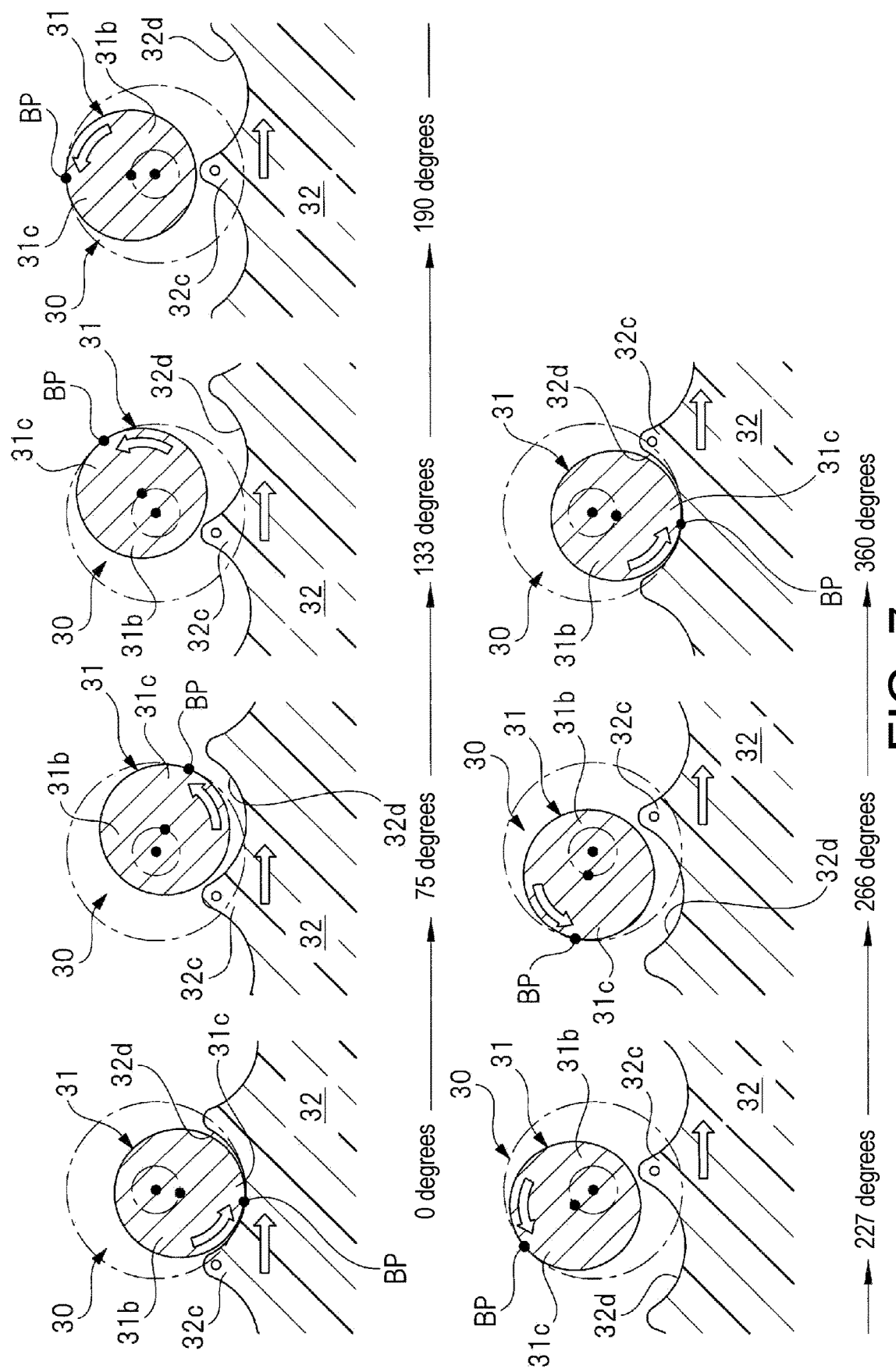

FIG. 7 is a view showing an engaging operation of the pinion gear and the helical gear.

Figure 8:
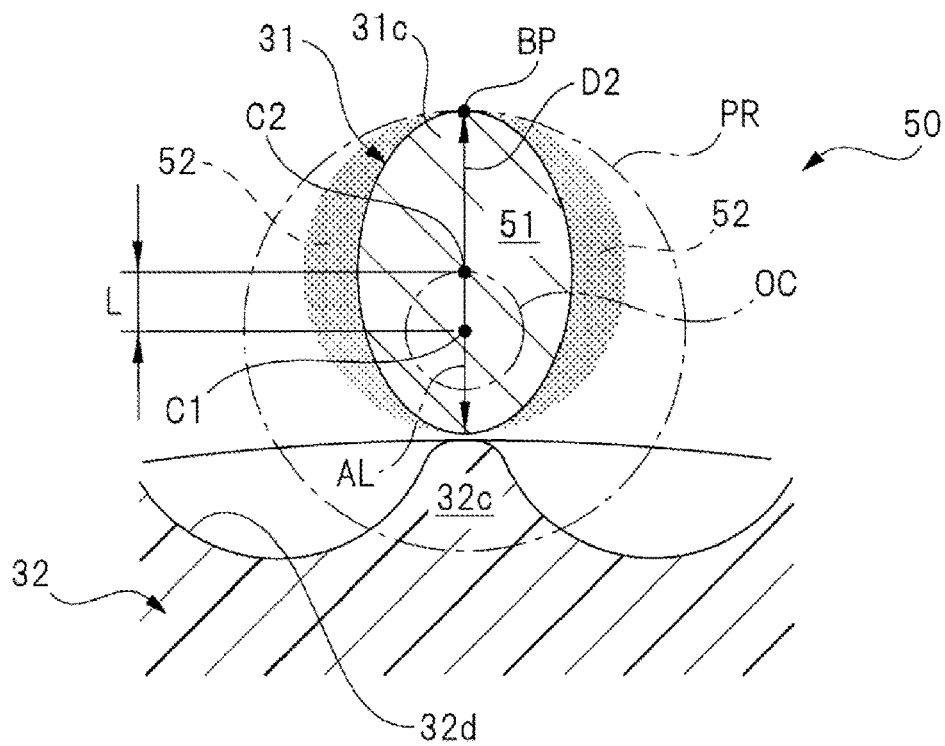

FIG. 8 is a view corresponding to (a) of FIG. 5 showing a second embodiment.

Figure 9:
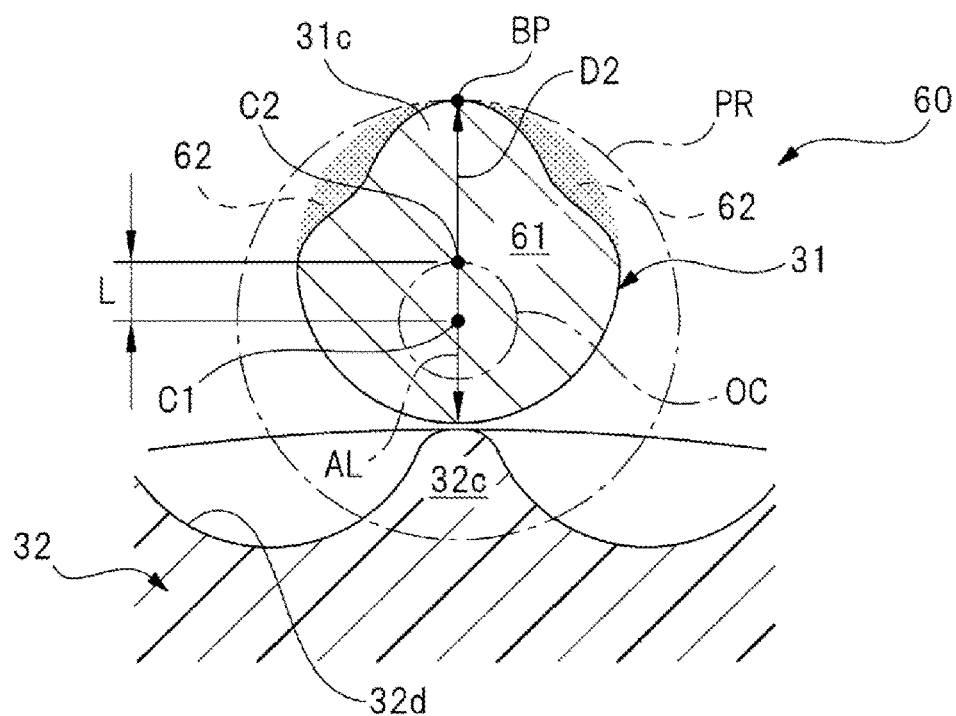

FIG. 9 is a view corresponding to (a) of FIG. 5 showing a third embodiment.

Figure 10:
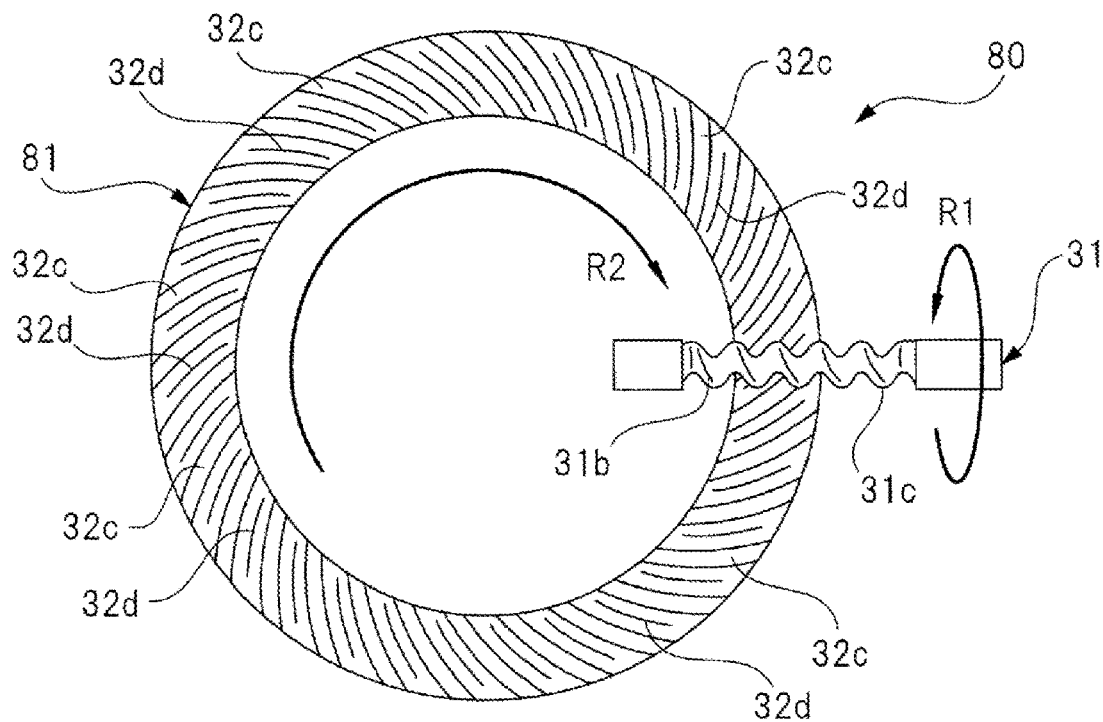

FIG. 10 is a view showing a fourth embodiment (face gear).

Figure 11:
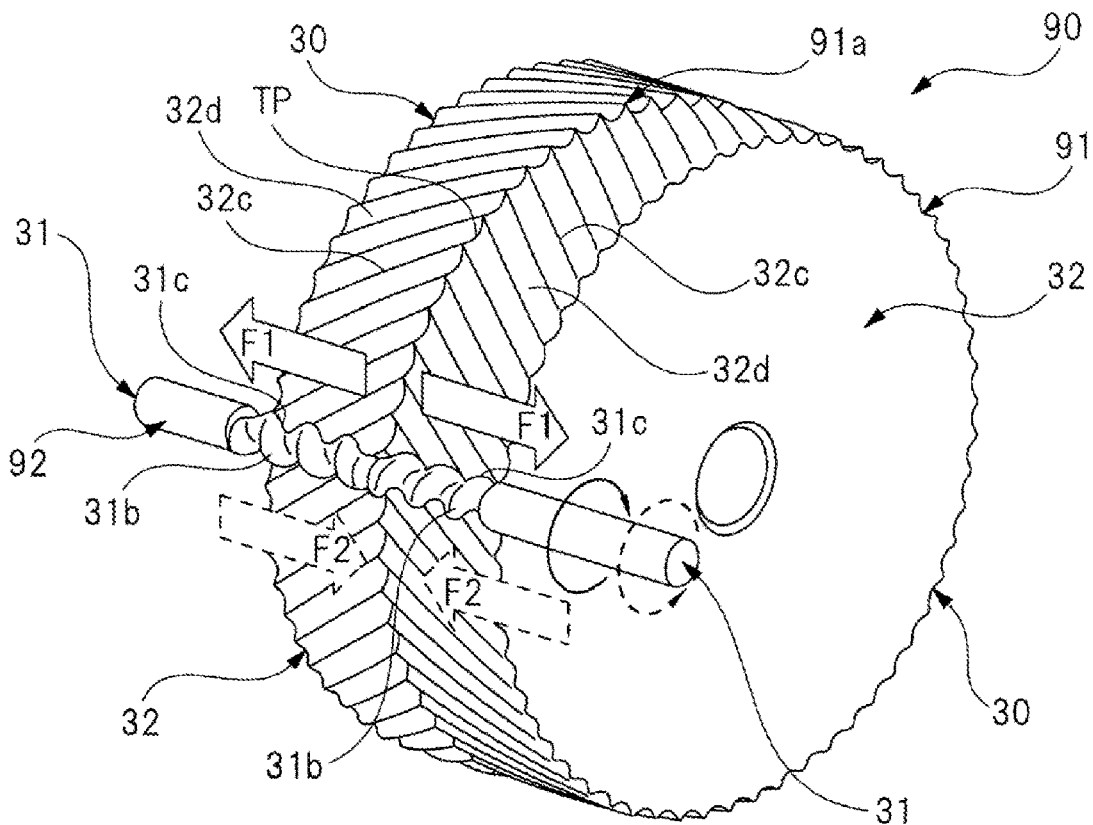

FIG. 11 is a view showing a fifth embodiment (herringbone gear).

Figure 12:
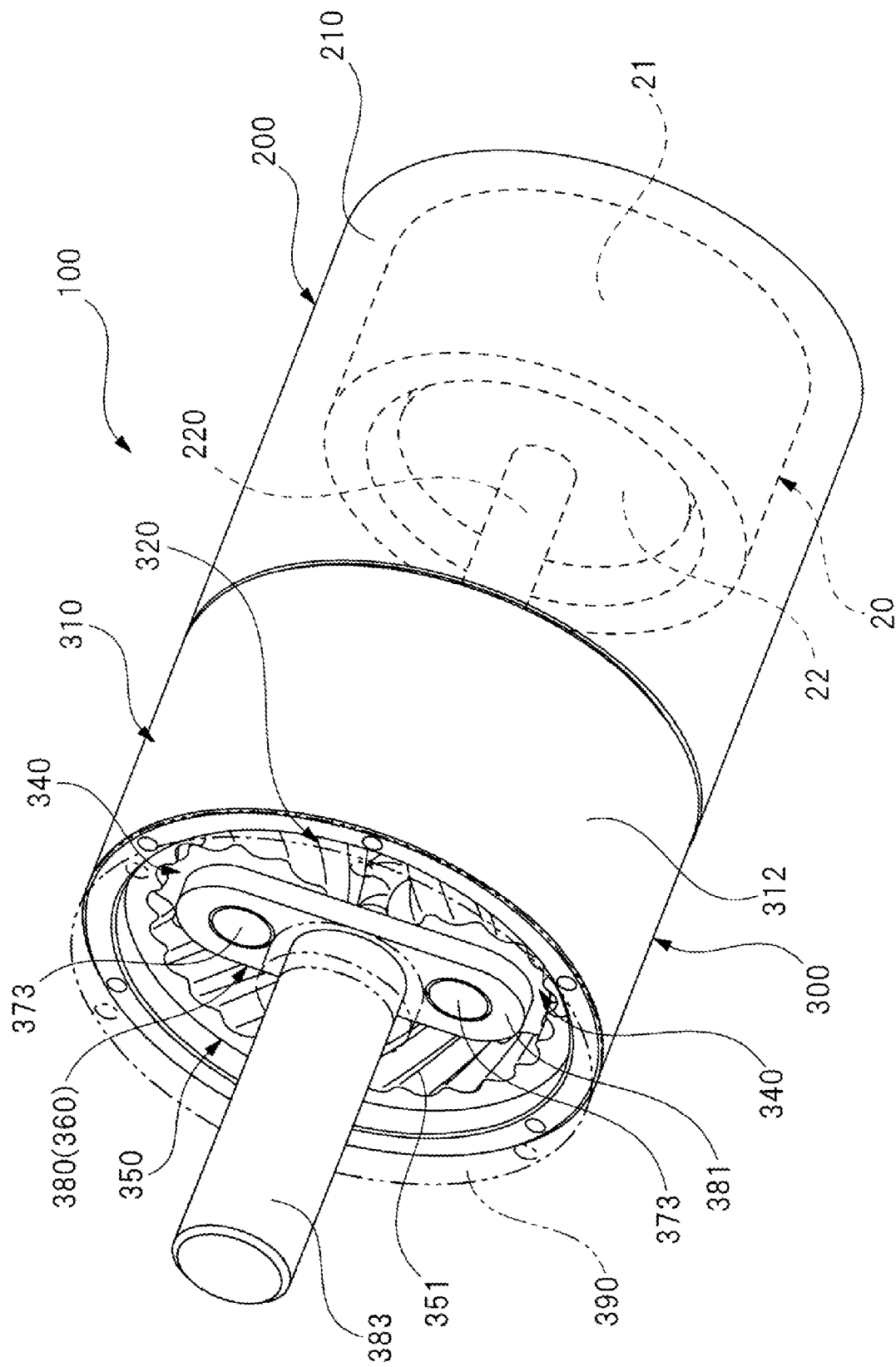

FIG. 12 is a perspective view showing a sixth embodiment (planetary gear reduction mechanism).

Figure 13:
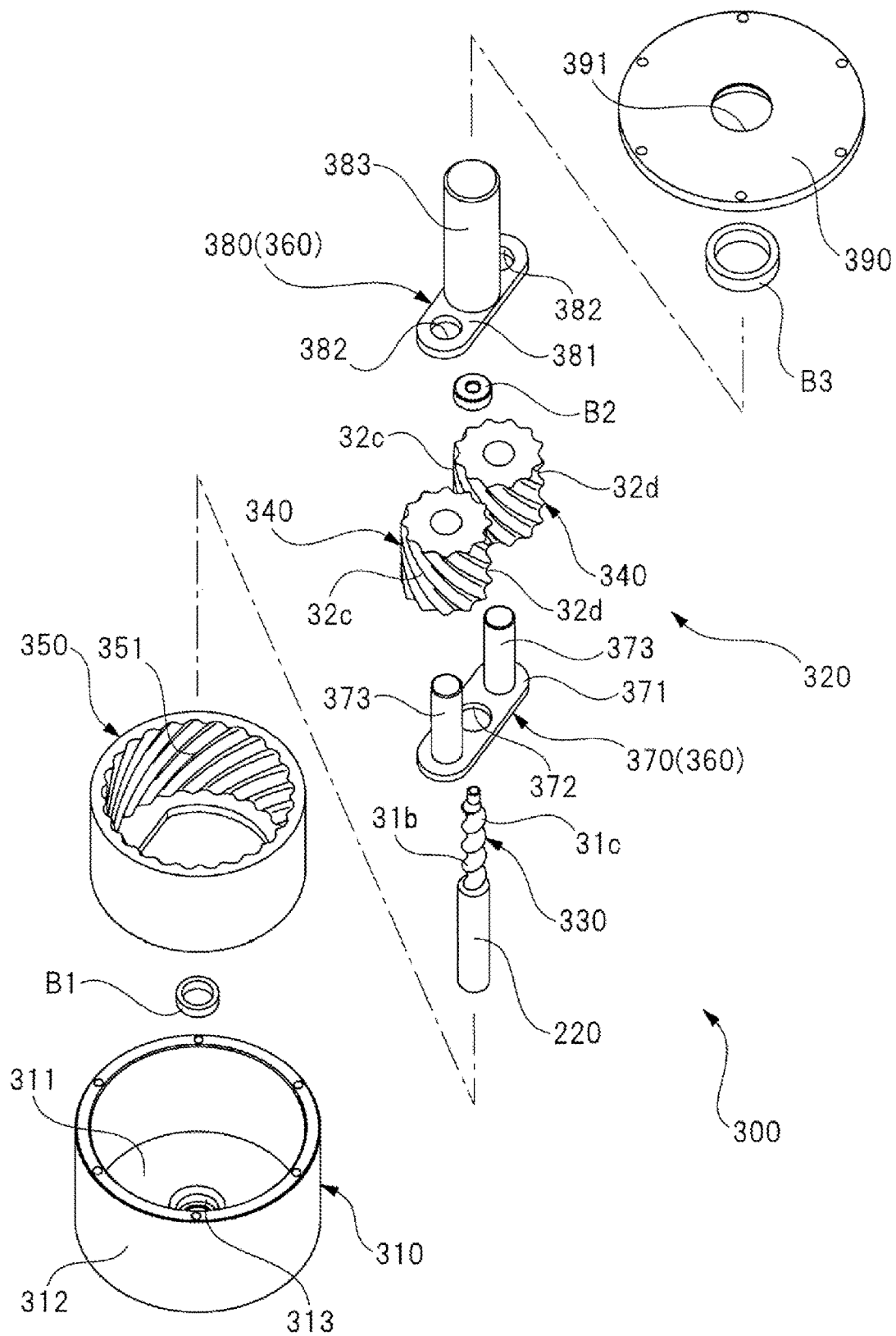

FIG. 13 is an exploded perspective view showing the planetary gear reduction mechanism of FIG. 12.

Figure 14:
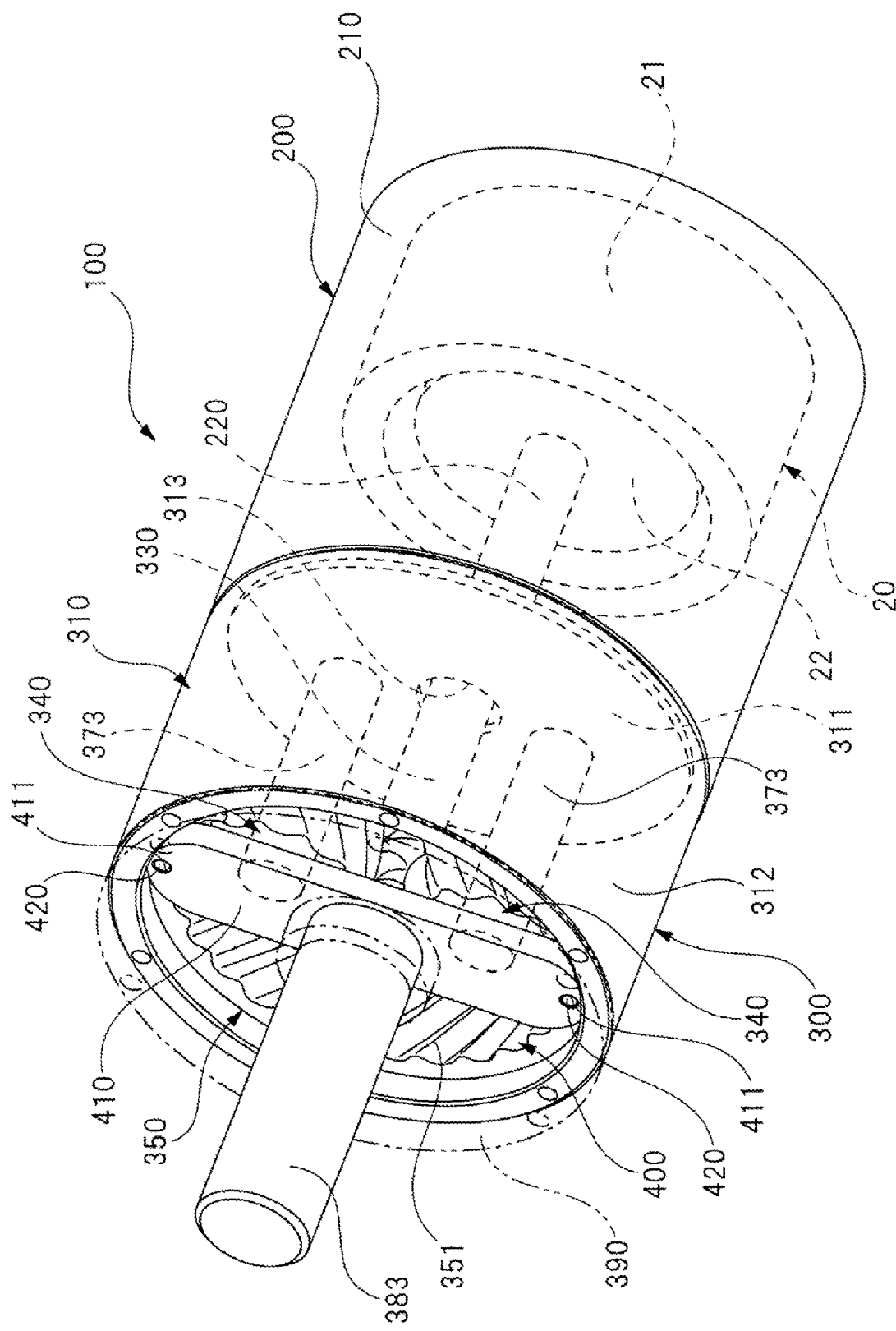

FIG. 14 is perspective view showing a seventh embodiment (another planetary gear reduction mechanism).

DESCRIPTION OF THE EMBODIMENTS

Hereinafter, a first embodiment of the disclosure will be described in detail with reference to the drawings.

Figure 1:
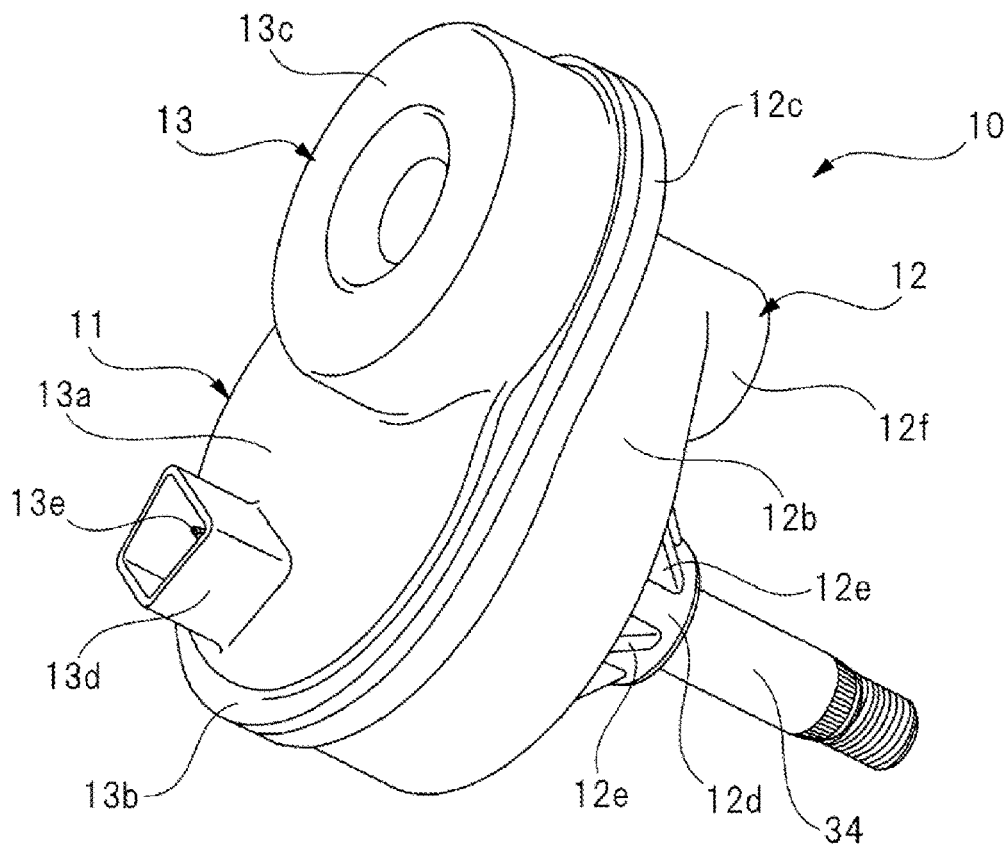
FIG. 1 is a perspective view of a motor equipped with a speed reduction mechanism as viewed from a connector connection part side.
Figure 2:
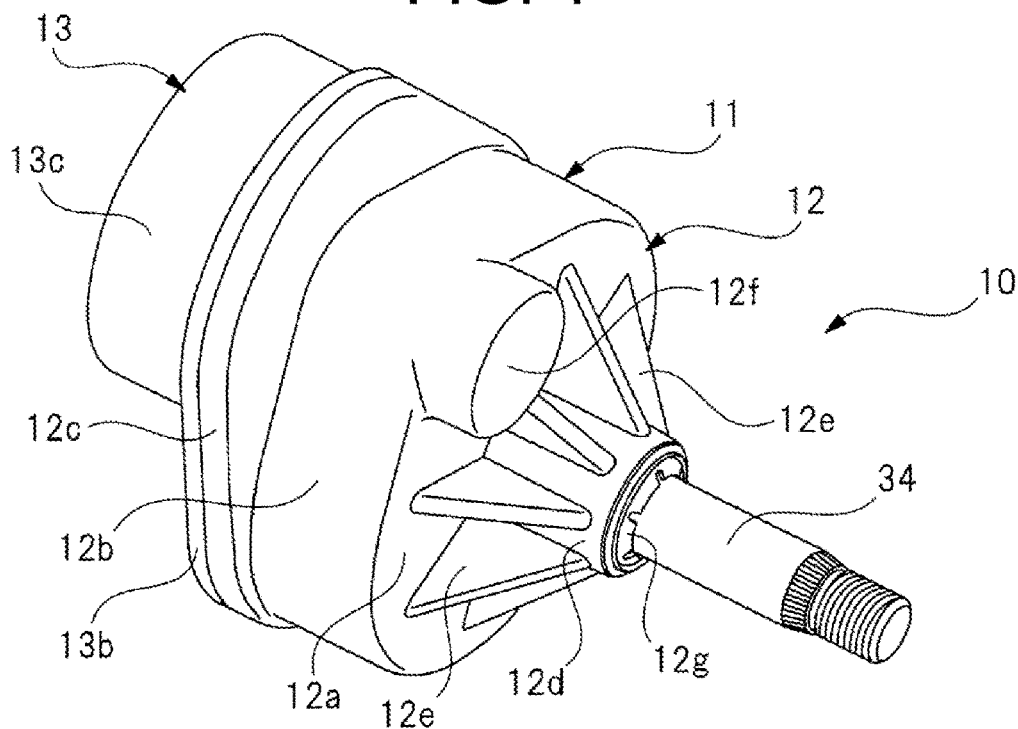
FIG. 2 is a perspective view of the motor equipped with a speed reduction mechanism as viewed from an output shaft side.
Figure 3:
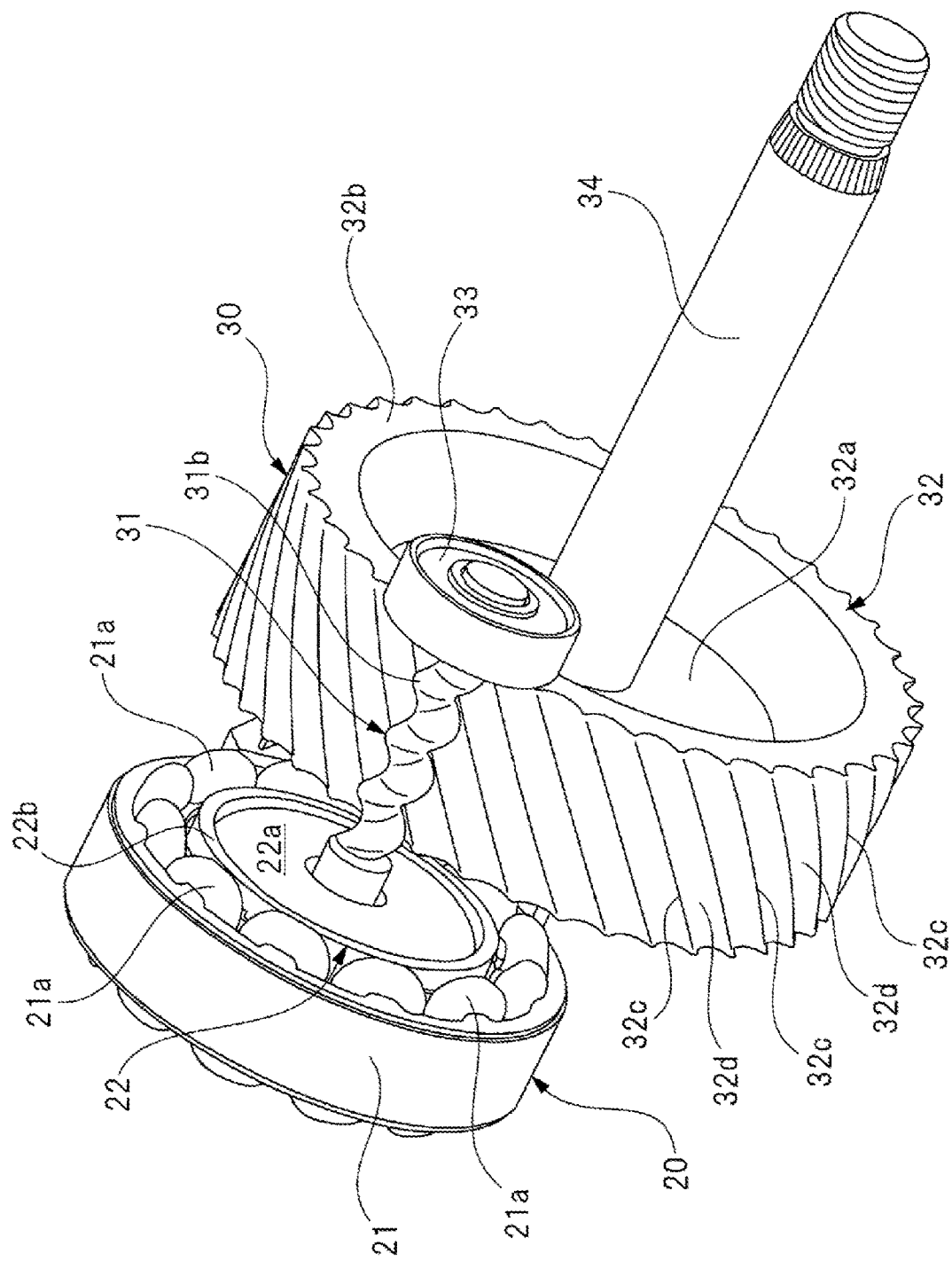
FIG. 3 is a perspective view showing an internal structure of the motor equipped with a speed reduction mechanism.

FIG. 1 is a perspective view of a motor equipped with a speed reduction mechanism as viewed from a connector connection part side. FIG. 2 is a perspective view of the motor equipped with a speed reduction mechanism as viewed from an output shaft side. FIG. 3 is a perspective view showing an internal structure of the motor equipped with a speed reduction mechanism. FIG. 4 is an enlarged perspective view of engaging portions of a pinion gear and a helical gear. (a) of FIG. 5 is a cross-sectional view taken along line A-A of FIG. 4, and (b) of FIG. 5 is a view showing determination of a shape of helical teeth based on a shape of an engagement projected part. FIG. 6 is a view showing detailed shapes of the pinion gear and the helical gear. FIG. 7 is a view showing an engaging operation of the pinion gear and the helical gear.

A motor 10 equipped with a speed reduction mechanism shown in FIG. 1 and FIG. 2 is used as a drive source of a wiper device (not shown) mounted on a vehicle such as an automobile. More specifically, the motor 10 equipped with a speed reduction mechanism swings a wiper member (not shown) arranged on the front side of a windshield (not shown) and swingably provided on the windshield within a predetermined wiping range (between a lower reversal position and an upper reversal position).

The motor 10 equipped with a speed reduction mechanism includes a housing 11 that forms its outer shell. As shown in FIG. 3, a brushless motor 20 and a speed reduction mechanism 30 are rotatably housed inside the housing 11. Here, the housing 11 is formed of a casing 12 made of aluminum and a cover member 13 made of plastic.

As shown in FIG. 1 and FIG. 2, the casing 12 is formed in a substantially bowl shape by injection molding of a molten aluminum material. Specifically, the casing 12 includes a bottom wall part 12a, a side wall part 12b provided integrally around the bottom wall part 12a, and a case flange 12c provided on the opening side (left side in the figure) of the casing 12.

A boss part 12d in a cylindrical shape that rotatably holds an output shaft 34 is integrally provided substantially at the central portion of the bottom wall part 12a. A cylindrical bearing member (not shown), which is so-called metal, is mounted on the radially inner side of the boss part 12d, thereby allowing the output shaft 34 to rotate smoothly without rattling with respect to the boss part 12d.

In addition, a plurality of reinforcing ribs 12e extending radially around the boss part 12d are integrally provided on the radially outer side of the boss part 12d. The reinforcing ribs 12e are arranged between the boss part 12d and the bottom wall part 12a, and are formed in a substantially triangular shape. The reinforcing ribs 12e are configured to enhance the fixing strength of the boss part 12d to the bottom wall part 12a and prevent occurrence of defects such as the boss part 12d being inclined with respect to the bottom wall part 12a.

Furthermore, a bearing member housing part 12f is integrally provided at a position of the bottom wall part 12a eccentric from the boss part 12d. The bearing member housing part 12f is formed in a cylindrical shape with a bottom, and protrudes in the same direction as the protruding direction of the boss part 12d. In addition, as shown in FIG. 3, a ball bearing 33 rotatably supporting the tip end side of a pinion gear 31 is housed inside the bearing member housing part 12f.

Moreover, as shown in FIG. 2, a retaining ring 12g is provided between the boss part 12d and the output shaft 34, thereby preventing the output shaft 34 from rattling in the axial direction of the boss part 12d. Consequently, the quietness of the motor 10 equipped with a speed reduction mechanism is ensured.

The cover member 13 forming the housing 11 is formed in a substantially flat plate shape by injection molding of a molten plastic material. Specifically, the cover member 13 includes a main body part 13a and a cover flange 13b integrally provided around the main body part 13a. Besides, the cover flange 13b is abutted against the case flange 12c via a seal member (not shown) such as an O-ring, thereby preventing rainwater and the like from entering the housing 11.

In addition, a motor housing part 13c for housing the brushless motor 20 (see FIG. 3) is integrally provided on the main body part 13a of the cover member 13. The motor housing part 13c is formed in a cylindrical shape with a bottom, and protrudes toward a side opposite to the casing 12 side. The motor housing part 13c faces the bearing member housing part 12f of the casing 12 when the cover member 13 is mounted on the casing 12. In addition, a stator 21 (see FIG. 3) of the brushless motor 20 is fixed inside the motor housing part 13c.

Furthermore, a connector connection part 13d connected with an external connector (not shown) on the vehicle side is integrally provided on the main body part 13a of the cover member 13. One-end sides of a plurality of terminal members 13e (only one is shown in FIG. 1) for supplying a drive current to the brushless motor 20 are exposed inside the connector connection part 13d. In addition, a drive current is supplied to the brushless motor 20 from the external connector via these terminal members 13e.

Moreover, a control substrate (not shown) for controlling the rotation state (rotation speed, rotation direction, and the like) of the brushless motor 20 is provided between another-end sides of the plurality of terminal members 13e and the brushless motor 20. Accordingly, the wiper member fixed to the tip end side of the output shaft 34 is swung on the windshield within a predetermined wiping range. The control substrate is fixed inside the main body part 13a of the cover member 13.

As shown in FIG. 3, the brushless motor 20 housed inside the housing 11 includes a stator 21 in an annular shape. The stator 21 is fixed inside the motor housing part 13c (see FIG. 1) of the cover member 13 in a rotation-stopped state.

The stator 21 is formed by stacking a plurality of thin steel plates (magnetic bodies), and a plurality of teeth (not shown) are provided on the radially inner side of the stator 21. U-phase, V-phase, and W-phase coils 21a are wound around these teeth in multiple turns by concentrated winding or the like. Accordingly, by alternately supplying a drive current to each coil 21a at a predetermined timing, a rotor 22 serving as a rotating body provided on the radially inner side of the stator 21 is rotated at a predetermined drive torque in a predetermined rotation direction.

The rotor 22 is rotatably provided on the radially inner side of the stator 21 via a minute gap (air gap). The rotor 22 includes a rotor body 22a formed by stacking a plurality of thin steel plates (magnetic bodies) into a substantially columnar shape. Besides, a permanent magnet 22b in a cylindrical shape is provided on the outer peripheral portion of the rotor 22. Here, the permanent magnet 22b is magnetized so that magnetic poles are arranged alternately in an order of an N pole, an S pole, . . . in the circumferential direction. The permanent magnet 22b is firmly fixed to the rotor body 22a in an integrally rotatable manner by an adhesive or the like.

As described above, the brushless motor 20 according to this embodiment is a brushless motor having a surface permanent magnet (SPM) structure in which the permanent magnet 22b is fixed to the surface of the rotor body 22a. However, the brushless motor is not limited to the SPM structure, and a brushless motor having an interior permanent magnet (IPM) structure in which a plurality of permanent magnets are embedded in the rotor body 22a may also be used.

In addition, in place of one permanent magnet 22b formed in a cylindrical shape, a plurality of permanent magnets of which a cross section along a direction intersecting with the axis of the rotor body 22a is formed in a substantially arc shape may be arranged at equal intervals so that the magnetic poles are arranged alternately in the circumferential direction of the rotor body 22a. Furthermore, the number of poles of the permanent magnet 22b may be arbitrarily set to, for example, 2 poles, 4 poles, or more, depending on the specifications of the brushless motor 20.

As shown in FIG. 3, the speed reduction mechanism 30 housed inside the housing 11 includes a pinion gear (first gear) 31 formed in a substantially rod shape and a helical gear (second gear) 32 formed in a substantially disc shape. Here, the axis of the pinion gear 31 and the axis of the helical gear 32 are parallel to each other. Accordingly, the speed reduction mechanism 30 can have a body size more compact than a worm reduction gear including a worm and a worm wheel of which the axes intersect each other.

In addition, the pinion gear 31 is arranged on the input side (drive source side) of the motor 10 equipped with a speed reduction mechanism, and the helical gear 32 is arranged on the output side (driving target side) of the motor 10 equipped with a speed reduction mechanism. That is, the speed reduction mechanism 30 reduces a high speed of rotation of the pinion gear 31 having a small number of teeth to a low speed of rotation of the helical gear 32 having a large number of teeth.

Here, the base end side of the pinion gear 31 is firmly fixed to the rotation center of the rotor body 22a by press fitting or the like, and the pinion gear 31 is integrally rotated with the rotor body 22a. That is, the pinion gear 31 is rotated by the rotor 22. In addition, the tip end side of the pinion gear 31 is rotatably supported by the ball bearing 33. Furthermore, the base end side of the output shaft 34 is firmly fixed to the rotation center of the helical gear 32 by press fitting or the like, and the output shaft 34 is integrally rotated with the helical gear 32.

The pinion gear 31 forming the speed reduction mechanism 30 is made of metal and has a shape as shown in FIG. 3 to FIG. 6. Specifically, the pinion gear 31 has a pinion body 31a formed in a substantially columnar shape, the axial base end side is fixed to the rotor body 22a, and the axial tip end side is rotatably supported by the ball bearing 33. That is, a rotation center C1 of the pinion gear 31 (pinion body 31a) coincides with the rotation centers of the rotor body 22a and the ball bearing 33.

A spiral tooth (first tooth part) 31b is integrally provided at a portion facing the helical gear 32 along the axial direction of the pinion body 31a. Specifically, the axial length of the spiral tooth 31b is set to be slightly longer than the axial length of the helical gear 32. Accordingly, the spiral tooth 31b may be reliably engaged with the helical gear 32. Besides, the spiral tooth 31b continuously extends in a spiral manner in the axial direction of the pinion gear 31, and the pinion gear 31 is provided with only one spiral tooth 31b. That is, the number of teeth of the pinion gear 31 is set to "1".

As shown in (a) of FIG. 5, the spiral tooth 31b is formed so that a cross-sectional shape along a direction orthogonal to the axial direction of the pinion gear 31 is in a circular shape. A center C2 of the spiral tooth 31b is eccentric (offset) from the rotation center C1 of the pinion gear 31 by a predetermined distance L. That is, the eccentric amount of the center C2 with respect to the rotation center C1 is L. Accordingly, the center C2 of the spiral tooth 31b follows a first rotation locus OC along with the rotation of the pinion gear 31. In other words, the first rotation locus OC forms a reference circle of the spiral tooth 31b.

Besides, as shown in (a) of FIG. 5, when an auxiliary line AL is drawn from the rotation center C1 of the pinion gear 31 toward the center C2 of the spiral tooth 31b (downward in the figure) and the auxiliary line AL is further extended to the surface of the spiral tooth 31b, the auxiliary line AL intersects with the surface of the spiral tooth 31b. This intersection point is an apex BP of an engagement projected part 31c. Here, the apex BP is provided on the engagement projected part 31c at the end part (surface) of the radially outer side of the pinion gear 31. In addition, the engagement projected part 31c, which constitutes an engagement part being a part of the spiral tooth 31b, also has a spiral shape and enters (engages with) an engagement recessed part 32d formed between adjacent helical teeth 32c of the helical gear 32.

In this way, the engagement projected part 31c is provided at a portion near the apex BP of the spiral tooth 31b. Besides, a cross-sectional shape of the engagement projected part 31c along a direction orthogonal to the axial direction of the pinion gear 31 is formed in an arc shape, and a curvature center C2 is provided at a position eccentric from the rotation center C1 of the pinion gear 31 by the predetermined distance L. That is, the curvature center C2 of the engagement projected part 31c coincides with the center C2 of the spiral tooth 31b.

Here, the apex BP of the engagement projected part 31c follows a second rotation locus PR along with the rotation of the pinion gear 31. That is, a diameter size D1 of the second rotation locus PR is larger than a diameter size D2 of the spiral tooth 31b (D1>D2).

Moreover, (a) of FIG. 5 shows a state in which the apex BP of the engagement projected part 31c has entered the engagement recessed part 32d of the helical gear 32, that is, a state in which the engagement projected part 31c is engaged with the engagement recessed part 32d.

Then, when the pinion gear 31 rotates, the apex BP of the engagement projected part 31c enters the plurality of engagement recessed parts 32d provided on the helical gear 32 one after another as the pinion gear 31 rotates. As a result, the helical gear 32 is rotated in a state of being decelerated from the pinion gear 31. At this time, specifically, the spiral tooth 31b follows a track Tr2 and a track Tr3 from a track Tr1 shown by dot-dashed lines in (a) of FIG. 5, and enters the adjacent engagement recessed part 32d.

As a result, the curvature center C2 of the engagement projected part 31c follows an operation locus Sep composed of a plurality of continuous arcs, as shown by a broken line in (a) of FIG. 5. The operation locus Sep is formed over the entire circumference (360 degrees) around the helical gear 32 as the pinion gear 31 and the helical gear 32 rotate.

The helical gear 32 forming the speed reduction mechanism 30 is made of plastic and has a shape as shown in FIG. 3 to FIG. 6. Specifically, the helical gear 32 includes a gear body 32a formed in a substantially disc shape, and the base end side of the output shaft 34 is firmly fixed to the central portion of the gear body 32a by press fitting or the like. In addition, a cylindrical part 32b extending in the axial direction of the output shaft 34 is integrally provided on the outer peripheral portion of the gear body 32a.

A plurality of helical teeth (the second tooth part) 32c are integrally provided on the radially outer side of the cylindrical part 32b so as to be aligned in the circumferential direction of the cylindrical part 32b. The helical teeth 32c are inclined with respect to the axial direction of the pinion gear 31 at a predetermined angle, and accordingly, the helical gear 32 rotates with the rotation of the spiral tooth 31b. Here, the number of the helical teeth 32c provided on the helical gear 32 is set to "40". That is, in this embodiment, the reduction ratio of the speed reduction mechanism 30 including the pinion gear 31 and the helical gear 32 is "40". The engaging operation of the pinion gear 31 and the helical gear 32 will be described below in detail.

As shown in FIG. 5 and FIG. 6, the engagement recessed part 32d is provided between the adjacent helical teeth 32c. Therefore, similar to the helical teeth 32c, the engagement recessed part 32d is also inclined with respect to the axial direction of the pinion gear 31 at a predetermined angle. The engagement projected part 31c of the pinion gear 31 enters and is engaged with the engagement recessed part 32d.

Here, a cross-section shape of the engagement recessed part 32d along a direction orthogonal to the axial direction of the pinion gear 31 is formed in an arc shape, and a curvature center C3 thereof is arranged on a reference circle TC of the helical gear 32. The reference circle (=first rotation locus OC) of the spiral tooth 31b is circumscribed to the reference circle TC of the helical gear 32.

Therefore, normally, the diameter size of the helical gear 32 is R (twice the distance between a rotation center C4 of the helical gear 32 and the first rotation locus OC) at the center of the helical gear 32c along the circumferential direction of the helical gear 32. In this embodiment, a cross-sectional shape of the spiral tooth 31b is circular, following the shape of the engagement projected part 31c. Thus, while the pinion gear 31 can be easily manufactured, a thick part T having a predetermined thickness exists on the side opposite to the apex BP side of the spiral tooth 31b.

Therefore, in order to prevent the interference (contact) between the spiral tooth 31b and the helical teeth 32c, the tooth depth of the helical teeth 32c is reduced by a relief amount E and set to a tooth depth H at which the spiral tooth 31b and the helical teeth 32c do not come into contact with each other. Here, the tooth depth H of the helical teeth 32c is the height from a root circle BC that passes through the deepest portion of the engagement recessed part 32d. In addition, because the number of the teeth of the helical gear 32 is "40" and the number of the engagement recessed parts 32d is also "40", an angle AG formed between the adjacent engagement recessed parts 32d in this embodiment is "9 degrees".

More specifically, as shown in (a) of FIG. 5 and (b) of FIG. 5, the shape of the helical teeth 32c and the shape of the engagement recessed part 32d are respectively determined based on the shape of the spiral tooth 31b (engagement projected part 31c). In addition, in (b) of FIG. 5, to make it easy to understand that the shapes of the helical teeth 32c and the engagement recessed part 32d are determined by the operation locus Sep of the curvature center C2 of the engagement projected part 31c, it is schematically shown differently from the actual shape of the helical teeth 32c (see (a) of FIG. 5).

That is, as shown in (b) of FIG. 5, when the helical gear 32 is viewed from the axial direction of the pinion gear 31, the shape of the helical teeth 32c is in a shape of a curve CL (offset curve of a solid line in the figure) that is shifted from the operation locus Sep (broken line in the figure) of the curvature center C2 of the engagement projected part 31c toward the radially inner side of the helical gear 32 by a curvature radius r of the engagement projected part 31c. In other words, if a plurality of points on the operation locus Sep are respectively shifted toward the radially inner side of the helical gear 32 by the curvature radius r and these points are connected, the curve CL is formed.

On the other hand, the shape of the engagement recessed part 32d is in a shape of an arc AR (the portion of the downward recessed arc of the solid line in the figure) of which the radius is the curvature radius r of the engagement projected part 31c, and the center is a point P arranged on the most radially inner side of the helical gear 32, i.e., the bottom dead center of the curvature center C2, among the points (not shown) forming the operation locus Sep (broken line in the figure) of the curvature center C2 of the engagement projected part 31c.

The curve CL and the arc AR are provided over the entire circumference (360 degrees) so as to be alternately connected around the helical gear 32. Accordingly, the shapes of the helical teeth 32c and the engagement recessed part 32d are determined by the operation locus Sep of the curvature center C2 of the engagement projected part 31c. On the other hand, as shown in FIG. 6, a diameter size SR of the engagement recessed part 32d is slightly larger than the diameter size D2 of the spiral tooth 31b (SR>D2). Half (½) of this size difference (SR−D2) is a so-called backlash (play between tooth surfaces). As a result, the engaging operation between the pinion gear 31 and the helical gear 32 is made smooth.

When determining the shapes of the helical teeth 32c and the engagement recessed part 32d, the required backlash amount (SR−D2)/2 should be taken into consideration. Specifically, the backlash amount (SR−D2)/2 is added to the curvature radius r of the engagement projected part 31c to determine the shapes of the curve CL and the arc AR (see (b) FIG. 5). In this way, by incorporating the backlash amount (SR−D2)/2 on the basis of the operation locus Sep of the curvature center C2 of the engagement projected part 31c, the smooth operation of the completed speed reduction mechanism 30 is guaranteed.

However, the backlash amount (SR−D2)/2 is appropriately determined according to the reduction ratio required for the speed reduction mechanism 30 (see FIG. 3) and the body size of the motor 10 equipped with the speed reduction mechanism (see FIG. 1).

Here, coordinates x and y of the operation locus Sep of the curvature center C2 of the engagement projected part 31c for forming the helical teeth 32c and the engagement recessed part 32d are defined by Formulas (1) and (2) below.

$$x = a \times \sin\theta - e \times \sin(Z+1) \times \theta \quad (1)$$

$$y = a \times \cos\theta - e \times \cos(Z+1) \times \theta \quad (2)$$

a: Distance between the curvature center C2 of the engagement projected part 31c and the rotation center C4 of the helical gear 32 ("R/2+2×L" in FIG. 6)
Z: Number of helical teeth 32c ("40" in this embodiment)
e: Eccentric amount of the curvature center C2 of the engagement projected part 31c with respect to the rotation center C1 of the pinion gear 31 ("L" in FIG. 6)
θ: Rotation angle of the pinion gear 31

That is, the operation locus Sep of the curvature center C2 of the engagement projected part 31c is a so-called "epitrochoid curve (outer trochoid curve)", and by determining the helical teeth 32c and the engagement recessed part 32d of the helical gear 32 based on this, while facilitating the design of the helical gear 32, the pinion gear 31 is reliably engaged. In other words, by matching the shape of the spiral tooth 31b (engagement projected part 31c) of the pinion gear 31, it is not necessary to adjust the helical teeth 32c and the engagement recessed part 32d of the helical gear 32 by trial and error, and the speed reduction mechanism 30 can be easily mass-produced.

From a viewpoint different from the above viewpoint, the shapes of the pinion gear 31 and the helical gear 32 are determined to respectively satisfy the following various formulas.

Specifically, the shape of the pinion gear 31 is determined based on Formula (3) below.

$$(D2+2+L) \times 2 = D1 \quad (3)$$

D2: Diameter size of the spiral tooth 31b
L: Eccentric amount
D1: Diameter size of the second rotation locus PR In addition, the shape of the helical gear 32 is determined based on Formulas (4) to (6) below.

$$L \times 2 \times \text{reduction ratio} = R \quad (4)$$

L: Eccentric amount
R: Diameter size of the center of the helical teeth 32c

Reduction ratio: "40" in this embodiment

That is, as shown in Formula (4) above, the reduction ratio of the pinion gear 31 and the helical gear 32 (speed reduction mechanism 30) is equal to a ratio of the first distance (=eccentric amount L) between the curvature center C2 of the engagement projected part 31c and the rotation center C1 of the pinion gear 31, to the second distance (=R/2) between the curvature center C3 of the engagement recessed part 32d and the rotation center C4 of the helical gear 32.

$$SR = D2 + \alpha \quad (5)$$

SR: Diameter size of the engagement recessed part 32d
D2: Diameter size of the spiral tooth 31b
α: Very small amount $$D2 \div 2 - L \times 2 + \beta = E \quad (6)$$

D2: Diameter size of the spiral tooth 31b
L: Eccentric amount
β: Very small amount
E: Relief amount of the tooth depth of the helical teeth 32c Here, the very small amounts α and β in Formulas (5) and (6) above are set values for smoothly engaging the engagement projected part 31c and the engagement recessed part 32d, i.e., corresponding to the above-mentioned backlash (play between tooth surfaces), and are appropriately set to minute optimum values according to the detailed shape of the tooth tip of the helical teeth 32c (minute curve, taper shape, and the like).

Next, the operation of the speed reduction mechanism 30 formed as described above, i.e., the engaging operation of the pinion gear 31 and the helical gear 32, will be described in detail with reference to the drawings.

The state shown as "0 degrees" in FIG. 7 is the same as the state shown in (a) of FIG. 5. In this state, the apex BP of the engagement projected part 31c of the pinion gear 31 is in a state of having entered the engagement recessed part 32d of the helical gear 32. That is, the engagement projected part 31c and the engagement recessed part 32d are in a state of being engaged with each other.

Then, during the operation of the speed reduction mechanism 30, the state in which the engagement projected part 31c and the engagement recessed part 32d are engaged with each other, i.e., the state shown as "0 degrees" of FIG. 7 (the state shown in (a) of FIG. 5), gradually moves in the axial direction of the spiral tooth 31b. Then, since the engagement recessed part 32d is inclined with respect to the axial direction of the pinion gear 31, the helical gear 32 is rotated at a speed reduced from the pinion gear 31 accordingly. In this way, the helical gear 32 rotates with the rotation of the pinion gear 31.

Here, when focusing on only a portion along the axial direction of the spiral tooth 31b (for example, a portion along line A-A in FIG. 4), the apex BP of the engagement projected part 31c is rotated in a counterclockwise direction along with the rotation of the pinion gear 31 in a counterclockwise direction in the state shown as "0 degrees" in FIG. 7. Accordingly, the engagement projected part 31c rotates in the order of "75 degrees"→"133 degrees"→"190 degrees"→"227 degrees"→"266 degrees", and gets over one helical tooth 32c. Subsequently, as shown in the state of "360 degrees" in FIG. 7, the engagement projected part 31c rotated once is engaged with the adjacent engagement recessed part 32d (see the moving state of the white circle in the figure).

In this way, when the spiral tooth 31b is rotated once, the helical gear 32 is rotated by the amount of one of the helical teeth 32c (one of the engagement recessed parts 32d). That is, the helical gear 32 is rotated by 9 degrees while the pinion gear 31 is rotated once. In other words, when the pinion gear 31 is rotated 40 times, the helical gear 32 is gradually rotated once (=reduction ratio "40"). Accordingly, the helical gear 32 is rotated at a rotational torque (high torque) 40 times that of the pinion gear 31.

As described above in detail, according to the first embodiment, one engagement projected part 31c having a spiral shape is provided on the pinion gear 31, and a plurality of engagement recessed parts 32d engaged with the engagement projected part 31c are provided on the helical gear 32. The engagement projected part 31c and the engagement recessed part 32d are each formed so that a cross-sectional shape along a direction orthogonal to the axial direction of the pinion gear 31 is in an arc shape, and the shape of the helical tooth 32c and the shape of the engagement recessed part 32d are determined based on the shape of the engagement projected part 31c provided on the spiral tooth 31b.

Therefore, the pinion gear 31 and the helical gear 32 may be configured in an arc-shaped projected/recessed engaging structure that does not deteriorate the state of engagement therebetween. Also, by increasing the number of teeth on the helical gear 32 ("40" in this embodiment) while keeping the number of teeth on the pinion gear 31 at one tooth, the difference in the number of teeth can be easily increased. Therefore, the reduction ratio of the speed reduction mechanism 30 can be increased without increasing the body size thereof.

Further, since the shape of the helical teeth 32c and the shape of the engagement recessed part 32d are determined based on the shape of the engagement projected part 31c provided on the spiral tooth 31b, the design of the helical gear 32 can be facilitated, and the pinion gear 31 can be reliably engaged. Therefore, by matching the shape of the engagement projected part 31c of the pinion gear 31, it is not necessary to adjust the helical teeth 32c and the engagement recessed part 32d of the helical gear 32 by trial and error, and the speed reduction mechanism 30 can be easily mass-produced.

Further, since backlash (play between the tooth surfaces) that smooths the mutual engaging operation is provided at the engaging portion of the pinion gear 31 and the helical gear 32, i.e., between the spiral tooth 31b (engagement projected part 31c) and the helical teeth 32c and the engagement recessed part 32d, the speed reduction mechanism 30 can be operated smoothly, and the quietness of the motor 10 equipped with the speed reduction mechanism can be improved.

Further, since the coordinates x and y of the operation locus Sep of the curvature center C2 of the engagement projected part 31c are defined by Formulas (1) and (2) above, the design of the helical gear 32 can be facilitated, and the pinion gear 31 can be reliably engaged.

Next, various embodiments according to the disclosure will be described in detail with reference to the drawings. The parts having the same functions as those in the first embodiment described above will be labeled with the same reference signs, and detailed descriptions thereof will be omitted.

FIG. 8 is a view corresponding to (a) of FIG. 5 showing a second embodiment. FIG. 9 is a view corresponding to (a) of FIG. 5 showing a third embodiment. FIG. 10 is a view showing a fourth embodiment (face gear). FIG. 11 is a view showing a fifth embodiment (herringbone gear). FIG. 12 is a perspective view showing a sixth embodiment (planetary gear reduction mechanism). FIG. 13 is an exploded perspective view showing the planetary gear reduction mechanism of FIG. 12. FIG. 14 is perspective view showing a seventh embodiment (another planetary gear reduction mechanism).

Second Embodiment

As shown in FIG. 8, in a speed reduction mechanism 50 according to the second embodiment, only the shape of a spiral tooth (first tooth part) 51 provided on the pinion gear 31 is different. Specifically, the spiral tooth 51 is formed so that a cross-sectional shape along a direction orthogonal to the axial direction of the pinion gear 31 is in a substantially elliptical shape. Specifically, a predetermined amount of two sides of the spiral tooth 51 is scraped off centered on an auxiliary line AL connecting the apex BP of the engagement projected part 31c and the rotation center C1 of the pinion gear 31. More specifically, the portion of a pair of arc-shaped spaces 52 (hatched portions) on two sides of the spiral tooth 51 centered on the auxiliary line AL is respectively scraped off. At this time, the portion is scraped off in a manner that the curvature center of the arc portion having the apex BP of the engagement projected part 31c is a C2 that is the same as in the first embodiment.

Similarly, in the second embodiment formed as described above, the same effects as those of the first embodiment can be obtained. In addition, in the second embodiment, as compared with the spiral tooth 31b (see (a) of FIG. 5) of the speed reduction mechanism 30 according to the first embodiment, since the volume of the pair of arc-shaped spaces 52 can be reduced, the pinion gear 31 can be made smaller and lighter.

Third Embodiment

As shown in FIG. 9, in a speed reduction mechanism 60 according to the third embodiment, only the shape of a spiral tooth (first tooth part) 61 provided on the pinion gear 31 is different. Specifically, the spiral tooth 61 is formed so that a cross-sectional shape along a direction orthogonal to the axial direction of the pinion gear 31 is in a substantially fan shape (substantially triangular rice ball shape). Specifically, a predetermined amount of the portion on two sides of the spiral tooth 61 and near the apex BP is scraped off centered on an auxiliary line AL connecting the apex BP of the engagement projected part 31c and the rotation center C1 of the pinion gear 31. Specifically, the portion of a pair of arc-shaped spaces 62 (hatched portions) on two sides of the spiral tooth 61 centered on the auxiliary line AL and near the apex BP is respectively scraped off. At this time, the portion is scraped off in a manner that the curvature center of the arc-shaped portion having the apex BP of the engagement projected part 31c is a C2 that is the same as in the first embodiment.

Similarly, in the third embodiment formed as described above, the same operational effects as those of the first embodiment can be obtained. In addition, in the third embodiment, as compared with the spiral tooth 31b (see (a) of FIG. 5) of the speed reduction mechanism 30 according to the first embodiment, since the volume of the pair of arc-shaped spaces 62 can be reduced, the pinion gear 31 can be made smaller and lighter. Further, as compared with the speed reduction mechanism 50 (see FIG. 8) according to the second embodiment, since the portion to be scraped off is small, the rigidity of the spiral tooth 61 is not reduced.

Moreover, instead of being a shape symmetrical on two sides centered on the auxiliary line AL as in the second and third embodiments, the shape may be asymmetrical on two sides centered on the auxiliary line AL. In addition, the shape of the portion to be scraped off is not limited to the arc shape as in the second and third embodiments, but may be a polygonal shape or the like, and the shape is not limited.

Fourth Embodiment

As shown in FIG. 10, in a speed reduction mechanism 80 according to the fourth embodiment, the only difference is that the gear engaged with the pinion gear 31 is a face gear 81 in place of the helical gear 32 as shown in FIG. 3. That is, in this embodiment, the face gear 81 constitutes the second gear in the disclosure. Specifically, the axis of the face gear 81 and the axis of the pinion gear 31 are orthogonal to each other, thereby forming a so-called crossed gear mechanism.

The face gear 81 is formed in an annular shape, and is provided with, on its surface, a plurality of helical teeth 32c and a plurality of engagement recessed parts 32d provided between the adjacent helical teeth 32c, as shown in FIG. 10. The plurality of helical teeth 32c and the plurality of engagement recessed parts 32d are inclined with respect to the axial direction of the pinion gear 31 and are arranged in the circumferential direction of the face gear 81. Accordingly, similar to the first embodiment, the engagement projected part 31c of the pinion gear 31 is engaged with the engagement recessed part 32d of the face gear 81.

Moreover, a high speed rotation of the pinion gear 31 in a direction of arrow R1 in the figure becomes a low speed rotation of the face gear 81 in a direction of arrow R2 in the figure. Then, a high torque rotating force is outputted from an output part (not shown) provided in the face gear 81 toward a driving target (not shown).

Similarly, in the fourth embodiment formed as described above, the same operational effects as those of the first embodiment can be obtained.

Fifth Embodiment

As shown in FIG. 11, a speed reduction mechanism 90 according to the fifth embodiment adopts a structure in which a pair of speed reduction mechanisms 30 including the pinion gear 31 and the helical gear 32 are abutted so as to be mirror-symmetrical to each other with an abutting part TP serving as a boundary. That is, the pair of helical gears 32 abutted against each other is a herringbone gear (second gear) 91 in the integrated state. The external appearance of herringbone teeth (second tooth part) 91a of the herringbone gear 91 is formed in a substantially V shape from the helical teeth 32c facing each other so as to be mirror-symmetrical to each other. Therefore, the engagement recessed parts 32d facing each other are provided between the adjacent herringbone teeth 91a so that the external appearance is in a substantially V shape.

In addition, in the pair of pinion gears 31 abutted against each other, a double pinion gear (first gear) 92 is formed in an integrated state. The double pinion gear 92 is provided with a pair of spiral teeth 31b facing each other so as to be mirror-symmetrical to each other. That is, the spiral teeth 31b have opposite spiral directions. The engagement projected parts 31c of the spiral teeth 31b are respectively engaged with the engagement recessed parts 32d between the adjacent herringbone teeth 91a.

Similarly, in the fifth embodiment formed as described above, the same operational effects as those of the first embodiment can be obtained. In addition, since the fifth embodiment adopts a structure in which a pair of speed reduction mechanisms 30 are abutted so as to be mirror-symmetrical to each other, that is, a herringbone gear structure, a thrust force that tends to move the herringbone gear 91 or the double pinion gear 92 in the axial direction can be canceled (eliminated), as shown by arrows F1 and F2 in FIG. 11.

That is, even if the double pinion gear 92 is rotated in the direction of the solid line arrow in the figure or in the direction of the broken line arrow in the figure, the double pinion gear 92 and the herringbone gear 91 rotated by the double pinion gear 92 do not move in the axial direction. Therefore, the structure on the housing side for housing the double pinion gear 92 and the herringbone gear 91 can be further simplified.

Sixth Embodiment

As shown in FIG. 12 and FIG. 13, in the sixth embodiment, a motor 100 equipped with a speed reduction mechanism is formed in a substantially cylindrical shape as a whole. The motor 100 equipped with a speed reduction mechanism includes a motor part 200 formed in a substantially cylindrical shape and a speed reduction mechanism part 300 similarly formed in a substantially cylindrical shape, and these components are provided coaxially with each other.

The motor part 200 includes a motor housing 210 in a bottomed cylindrical shape that forms an outer shell of the motor 100 equipped with a speed reduction mechanism, and a brushless motor 20 is housed inside the motor housing 210. A stator 21 forming the brushless motor 20 is fixed to the inner wall of the motor housing 210 by an adhesive or the like (not shown), and a rotor 22 is rotatably provided on the radially inner side of the stator 21 via a predetermined gap. An axial base end part of a driving shaft 220 is firmly fixed to the rotation center of the rotor 22 by press fitting or the like. Accordingly, the motor part 200 includes the driving shaft 220 that is rotated by the rotor 22.

Further, the speed reduction mechanism part 300 includes a gear housing 310 in a bottomed tubular shape that forms the outer shell of the motor 100 equipped with a speed reduction mechanism. The gear housing 310 includes a bottom wall part 311 formed in a substantially disc shape, and a cylindrical wall part 312 integrally provided with the bottom wall part 311. Further, an insertion hole 313 through which the axial base end side (lower side in FIG. 13) of the driving shaft 220 is inserted is formed at the central portion of the bottom wall part 311. Here, a first bearing B1 that rotatably supports the axial base end side of the driving shaft 220 is fixed on the radially inner inside of the insertion hole 313. Accordingly, the driving shaft 220 can rotate smoothly with respect to the gear housing 310. A cylindrical slide bearing, which is so-called metal, is used as the first bearing B1.

Further, a planetary gear reduction mechanism 320 serving as a speed reduction mechanism is housed inside the gear housing 310. The planetary gear reduction mechanism 320 includes a sun gear (first gear) 330 rotated by the driving shaft 220, a pair of planetary gears (second gears) 340 rotated by the sun gear 330, and an internal gear (ring gear) 350 that is engaged with the pair of planetary gears 340.

The sun gear 330 is exactly the same as the pinion gear 31 (see FIG. 4) described above, and includes a spiral tooth 31b and an engaged projected part 31c. The axial base end part of the sun gear 330 is integrally provided on the axial tip end part of the driving shaft 220. That is, the driving shaft 220 and the sun gear 330 are formed of one member (made of metal) and are arranged coaxially with each other. Therefore, the sun gear 330 is rotated by the driving shaft 220.

The pair of planetary gears 340 are arranged to face each other centered on the sun gear 330 and revolve around the sun gear 330. The planetary gears 340 are the same as each other, and helical teeth 32c the same as the above helical gear 32 (see FIG. 3) are provided on the outer peripheral portion of the planetary gear 340. Then, an engagement recessed part 32d in which the engagement projected part 31c of the sun gear 330 enters (engages with) is formed between the adjacent helical teeth 32c. Therefore, the planetary gear 340 is rotated by the sun gear 330.

Further, each of the pair of planetary gears 340 is rotatably supported by a carrier 360. The carrier 360 is formed by assembling a first member 370 and a second member 380 together. The first member 370 includes a first main body part 371 formed in a substantially rectangular plate shape. An insertion hole 372 through which the axial tip end side of the driving shaft 220 is inserted in a non-contact state is formed at the central portion in the longitudinal direction of the first main body part 371. Further, a pair of support shafts 373 that respectively rotatably support the pair of planetary gears 340 are provided on two sides of the first main body part 371 in the longitudinal direction. The sun gear 330 is sandwiched between the planetary gears 340 respectively rotatably supported by the support shafts 373. Accordingly, one engagement projected part 31c provided on the sun gear 330 is engaged with the engagement recessed parts 32d respectively provided on the pair of planetary gears 340 in the same state as shown in (a) of FIG. 5.

Further, the second member 380 forming the carrier 360 includes a second main body part 381 formed in a substantially rectangular plate shape. An insertion hole (not shown) through which the axial tip end part of the sun gear 330 is inserted in a non-contact state is formed at the central portion of the second main body part 381 in the longitudinal direction. Further, a pair of support holes 382 for supporting the end parts of the pair of support shafts 373 are formed on two sides of the second main body part 381 in the longitudinal direction. An opening end part (not shown) of an output shaft 383 that is formed in a bottomed tubular shape is fixed to a portion of the second main body part 381 corresponding to the insertion hole. A second bearing B2 that rotatably supports the axial tip end part of the sun gear 330 is fixed to the portion of the opening end part of the output shaft 383 and the portion of the insertion hole of the second body part 381. Accordingly, the sun gear 330 can rotate smoothly with respect to the output shaft 383. A cylindrical slide bearing, which is so-called metal, is also used as the second bearing B2. As described above, the carrier 360 rotatably supports the pair of planetary gears 340 and includes the output shaft 383 coaxial with the sun gear 330.

Further, the internal gear 350 formed in a substantially cylindrical shape is fixed inside the cylindrical wall part 312 forming the gear housing 310 in a relatively non-rotatable manner. Further, a plurality of internal teeth 351 with which the helical teeth 32c of the pair of planetary gears 340 are engaged are provided on the inner peripheral portion of the internal gear 350. The internal teeth 351 are also formed in the same shape as the helical teeth 32c provided on the planetary gear 340.

Further, the opening side portion (upper portion in FIG. 13) of the gear housing 310 is closed by a gear cover 390 formed in a substantially disc shape. Accordingly, the assembled planetary gear reduction mechanism 320 can be operated inside the gear housing 310 without rattling and disassembling. Further, an insertion hole 391 through which the output shaft 383 is inserted in a non-contact state is formed in the central portion of the gear cover 390. A third bearing B3 that rotatably supports the output shaft 383 is fixed on the radially inner side of the insertion hole 391. Accordingly, the output shaft 383 can rotate smoothly with respect to the gear cover 390. A cylindrical slide bearing, which is so-called metal, is also used as the third bearing B3.

Similarly, in the sixth embodiment formed as described above, the same effects as those of the first embodiment can be obtained.

Seventh Embodiment

As shown in FIG. 14, in the seventh embodiment, only the structure of a planetary gear reduction mechanism (speed reduction mechanism) 400 is different from that of the sixth embodiment. The parts having the same functions as those in the sixth embodiment will be labeled with the same symbols, and detailed descriptions thereof will be omitted.

In the planetary gear reduction mechanism 400 of the seventh embodiment, a pair of planetary gears 340 are rotatably supported by a bottom wall part 311 of a gear housing 310. Specifically, the bottom wall part 311 is provided with a pair of support shafts 373 that respectively rotatably support the pair of planetary gears 340. That is, the pair of planetary gears 340 perform a rotation motion that rotates on the pair of support shafts 373, but do not perform a revolution motion that rotates around the sun gear 330.

Further, in the planetary gear reduction mechanism 400 of the seventh embodiment, the internal gear 350 is rotatably provided with respect to the gear housing 310. Specifically, the internal gear 350 is arranged in the gear housing 310 in a state where the outer peripheral wall of the internal gear 350 is not in contact with the inner peripheral wall of the cylindrical wall part 312. That is, in the sixth embodiment, the pair of planetary gears 340 supported by the carrier 360 (see FIG. 13) are made rotatable with respect to the gear housing 310, and the internal gear 350 is fixed to the gear housing 310. However, in the seventh embodiment, in contrast to the sixth embodiment, the pair of planetary gears 340 are fixed to the gear housing 310 by the bottom wall part 311, and the internal gear 350 is rotatable with respect to the gear housing 310.

The output shaft 383, which is coaxial with the sun gear 330, rotates together with the internal gear 350. Specifically, the output shaft 383 is fixed to the internal gear 350 via a flat plate-shaped power transmission member 410. The power transmission member 410 is formed in a substantially rectangular shape, and its two sides in the longitudinal direction are respectively provided with fixing holes 411 to which fixing pins 420 are fixed. Axial one-sides of the pair of fixing pins 420 are respectively fixed to the fixing holes 411. Further, axial another-sides of the pair of fixing pins 420 are respectively fixed to fixing holes (not shown) of an end part of the internal gear 350 on the axial one-side. Accordingly, the power transmission member 410 rotates together with the internal gear 350 as the internal gear 350 rotates.

An opening end part (not shown) of the output shaft 383 is fixed to the central portion of the power transmission member 410 in the longitudinal direction. A portion of the power transmission member 410 to which the output shaft 383 is fixed is provided with an insertion hole (not shown) similar to the insertion hole 372 (see FIG. 13) provided in the first main body part 371.

As described above, in the seventh embodiment, the output shaft 383 rotates together with the internal gear 350. That is, the output shaft 383 coaxial with the sun gear 330 is provided on the internal gear 350 via the power transmission member 410.

Similarly, in the seventh embodiment formed as described above, the same effects as those in the first embodiment can be obtained.

The disclosure is not limited to the above embodiments, and numerous changes may be made without departing from the spirit of the disclosure. For example, although the embodiments described above have shown that the speed reduction mechanisms 30, 50, 60, 80, and 90 and the planetary gear reduction mechanisms 320 and 400 (motors 10 and 100 equipped with a speed reduction mechanism) are applied to a drive source of a wiper device mounted on a vehicle, the disclosure is not limited thereto. They may also be applied to other drive sources of a power window device, a sunroof device, a seat lifter device, and the like.

Furthermore, although the embodiments described above have shown the motors 10 and 100 equipped with a speed reduction mechanism in which the speed reduction mechanisms 30, 50, 60, 80, and 90 and the planetary gear reduction mechanisms 320 and 400 are driven by the brushless motor 20, the disclosure is not limited thereto, and a brushed motor may be used in place of the brushless motor 20 to drive the speed reduction mechanisms 30, 50, 60, 80, and 90 and the planetary gear reduction mechanisms 320 and 400.

Besides, the material, shape, size, number, installation location, and the like of each constituent component in each of the above-described embodiments are freely selected as long as the disclosure may be achieved, and are not limited to the above-described embodiments.

What is claimed is:

1. A speed reduction mechanism comprising a first gear and a second gear, and comprising:
   one first tooth part provided on the first gear and spirally extending in an axial direction of the first gear;
   an engagement projected part that is provided on the first tooth part, has a cross-sectional shape, which is along a direction orthogonal to the axial direction of the first gear, formed in an arc shape, and has a curvature center provided at a position eccentric from a rotation center of the first gear;
   a plurality of second tooth parts that are provided on the second gear, are inclined with respect to the axial direction of the first gear, and are arranged in a circumferential direction of the second gear; and
   an engagement recessed part that is provided between adjacent second tooth parts, has a cross-sectional shape, which is along a direction orthogonal to the axial direction of the first gear, formed in an arc shape, and is engaged with the engagement projected part,
   wherein when the second gear is viewed from the axial direction of the first gear,
   a shape of the second tooth part is in a curve shape that is shifted from an operation locus of the curvature center of the engagement projected part toward a radially inner side of the second gear by a curvature radius of the engagement projected part, and
   a shape of the engagement recessed part is in an arc shape having a radius that is the curvature radius of the engagement projected part and having a center that is a point arranged on a most radially inner side of the second gear among points that form the operation locus of the curvature center of the engagement projected part.

2. The speed reduction mechanism according to claim 1, wherein coordinates x and y of the operation locus of the curvature center of the engagement projected part are defined by Formulas (1) and (2) below:

$$x = a \times \sin\theta - e \times \sin(Z+1) \times \theta \quad (1)$$

$$y = a \times \cos\theta - e \times \cos(Z+1) \times \theta \quad (2)$$

where
- a is a distance between the curvature center of the engagement projected part and a rotation center of the second gear,
- Z is a number of the second tooth parts,
- e is an eccentric amount of the curvature center of the engagement projected part with respect to the rotation center of the first gear, and
- θ is a rotation angle of the first gear.

3. A motor equipped with a speed reduction mechanism, comprising:
   a motor having a rotating body;
   a first gear rotated by the rotating body; and
   a second gear rotated by the first gear,
   the motor equipped with a speed reduction mechanism further comprising:
   one first tooth part provided on the first gear and spirally extending in an axial direction of the first gear;
   an engagement projected part that is provided on the first tooth part, has a cross-sectional shape, which is along a direction orthogonal to the axial direction of the first gear, formed in an arc shape, and has a curvature center provided at a position eccentric from a rotation center of the first gear;
   a plurality of second tooth parts that are provided on the second gear, are inclined with respect to the axial direction of the first gear, and are arranged in a circumferential direction of the second gear;
   an engagement recessed part that is provided between adjacent second tooth parts, has a cross-sectional shape, which is along a direction orthogonal to the axial direction of the first gear, formed in an arc shape, and is engaged with the engagement projected part; and
   an output shaft provided at a rotation center of the second gear,
   wherein when the second gear is viewed from the axial direction of the first gear,
   a shape of the second tooth part is in a curve shape that is shifted from an operation locus of the curvature center of the engagement projected part toward a radially inner side of the second gear by a curvature radius of the engagement projected part, and
   a shape of the engagement recessed part is in an arc shape having a radius that is the curvature radius of the engagement projected part and having a center that is a point arranged on a most radially inner side of the second gear among points that form the operation locus of the curvature center of the engagement projected part.

4. The motor equipped with a speed reduction mechanism according to claim 3, wherein coordinates x and y of the operation locus of the curvature center of the engagement projected part are defined by Formulas (1) and (2) below:

$$x = a \times \sin\theta - e \times \sin(Z+1) \times \theta \quad (1)$$

$$y = a \times \cos\theta - e \times \cos(Z+1) \times \theta \quad (2)$$

where
- a is a distance between the curvature center of the engagement projected part and the rotation center of the second gear,
- Z is a number of the second tooth parts,
- e is an eccentric amount of the curvature center of the engagement projected part with respect to the rotation center of the first gear, and
- θ is a rotation angle of the first gear.

* * * * *